United States Patent
Kasai et al.

(10) Patent No.: US 8,285,935 B2
(45) Date of Patent: Oct. 9, 2012

(54) CACHE CONTROL APPARATUS AND METHOD

(75) Inventors: Yosuke Kasai, Yokohama (JP); Manabu Obana, Kawasaki (JP); Akihiko Sakaguchi, Tachikawa (JP)

(73) Assignee: Hitachi, Ltd., Tokyo (JP)

( * ) Notice: Subject to any disclaimer, the term of this patent is extended or adjusted under 35 U.S.C. 154(b) by 540 days.

(21) Appl. No.: 12/511,769

(22) Filed: Jul. 29, 2009

(65) Prior Publication Data
US 2010/0312967 A1 Dec. 9, 2010

(30) Foreign Application Priority Data
Jun. 9, 2009 (JP) ................. 2009-138605

(51) Int. Cl.
*G06F 12/00* (2006.01)
(52) U.S. Cl. ................. 711/118; 711/E12.052
(58) Field of Classification Search .......... 711/118, 711/E12.052
See application file for complete search history.

(56) References Cited

U.S. PATENT DOCUMENTS

| 2006/0026229 | A1 | 2/2006 | Ari et al. | |
| 2008/0104343 | A1* | 5/2008 | Miyagaki et al. | 711/158 |
| 2008/0201341 | A1* | 8/2008 | Okamoto et al. | 707/100 |

FOREIGN PATENT DOCUMENTS

| JP | 01-314358 | | 12/1989 |
| JP | 04-191947 | | 7/1992 |
| JP | 10-254778 | | 9/1998 |
| JP | 2000-089916 | | 3/2000 |
| JP | 2000-347938 | | 12/2000 |
| JP | 2001-175537 | | 6/2001 |
| JP | 2006-350780 | | 12/2006 |
| JP | 2007-102314 | | 4/2007 |
| JP | 2007-537548 | A | 12/2007 |

* cited by examiner

*Primary Examiner* — Jared Rutz
*Assistant Examiner* — Gurtej Bansal
(74) *Attorney, Agent, or Firm* — Foley & Lardner LLP

(57) ABSTRACT

A cache control apparatus is provided in a computer system including an access source and a storage apparatus. This device, based on I/O status information, which is information denoting the I/O status in accordance with an I/O command from the access source, determines whether or not the I/O performance from the access source drops. In a case where the result of this determination is affirmative, the cache control apparatus changes a cache utilization status specified from cache utilization status information, which is information denoting the cache utilization status related to a cache area, to a cache utilization status that improves I/O performance.

19 Claims, 12 Drawing Sheets

| NO | APPLICATION NAME | TIME | VOLUME (LUN) | REQUIRED I/O PERFORMANCE |
|---|---|---|---|---|
| 1 | Application11 | 2009/02/03 12:23:00.230 | #311 | 3Gbit/s |
| 2 | Application11 | 2009/02/03 12:23:00.232 | #312 | 4Gbit/s |
| 3 | Application11 | 2009/02/03 12:23:00.240 | #411 | 8Gbit/s |
| 4 | Application21 | 2009/02/03 12:23:00.230 | #311 | 2Gbit/s |
| 5 | Application21 | 2009/02/03 12:23:00.232 | #312 | 2Gbit/s |
| 6 | Application21 | 2009/02/03 12:23:00.240 | #321 | 4Gbit/s |

201

| NO | VOLUME | APPLICATION NAME | TIME | MEASURED I/O PERFORMANCE | I/O INCREASING RATE |
|---|---|---|---|---|---|
| 1 | #311 | Application11 | 2009/02/03 12:23:00.230 | 4Gbit/s | 120% |
| 2 | #311 | Application31 | 2009/02/03 12:23:00.232 | 3Gbit/s | 80% |
| 3 | #311 | Application21 | 2009/02/03 12:23:00.240 | 3Gbit/s | 60% |

| NO | CACHE ID | READ HIT RATE | WRITE HIT RATE | WRITE RATIO | RESIDENT TRACK READ RATIO | CAPACITY | CACHE MODE |
|---|---|---|---|---|---|---|---|
| 1 | STORAGE1 CLPR11 | 90% | 45% | 90% | 10% | 64GB | STATIC MODE |
| 2 | STORAGE1 CLPR12 | 50% | 30% | 80% | 0% | 64GB | P-MODE |
| 3 | STORAGE2 CLPR21 | 30% | 30% | 60% | 20% | 32GB | B-MODE |
| 4 | STORAGE2 CLPR22 | 20% | 20% | 50% | 0% | 96GB | STATIC MODE |
| 5 | STORAGE3 CLPR31 | 50% | 50% | 70% | 15% | 32GB | B-MODE |
| 6 | STORAGE3 CLPR32 | 30% | 30% | 30% | 0% | 96GB | P-MODE |
| 7 | STORAGE4 CLPR41 | 30% | 30% | 70% | 20% | 32GB | B-MODE |
| 8 | STORAGE4 CLPR42 | 70% | 70% | 30% | 80% | 96GB | STATIC MODE |

| NO | TIME | STORAGE | LUN | MIGRATION-SOURCE PG | MIGRATION-DESTINATION PG |
|---|---|---|---|---|---|
| 1 | 2009/2/15 11:12:12.000 | STORAGE3 | #313 | 3-1-1 | 4-1-2 |
| 2 | 2009/2/15 12:12:12.000 | STORAGE4 | #421 | 3-1-2 | 1-1-1 |

| LUN | LBA RANGE | I/O PERFORMANCE | |
|---|---|---|---|
| | | WRITE | READ |
| #001 | 0000-0999 | | |
| | 1000-1999 | | |
| | ... | ... | ... |

511

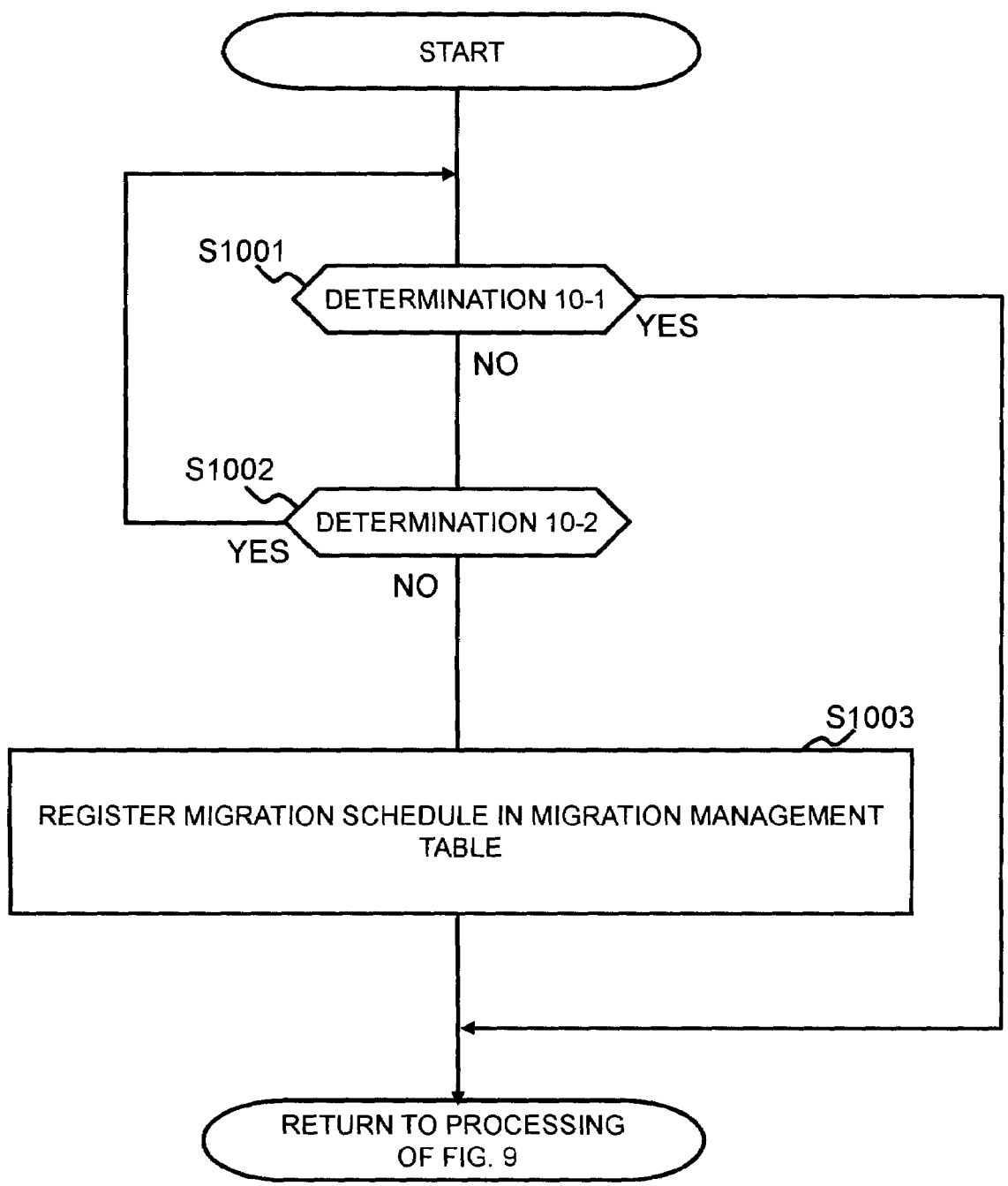

CACHE CONTROL APPARATUS AND METHOD

CROSS-REFERENCE TO PRIOR APPLICATION

This application relates to and claims the benefit of priority from Japanese Patent Application number 2009-138605, filed on Jun. 9, 2009 the entire disclosure of which is incorporated herein by reference.

BACKGROUND

The present invention generally relates to the control of a cache.

Data is generally held in a cache area. For example, a storage apparatus includes a cache memory in addition to a disk device (for example, a hard disk) (for example, Japanese translation of PCT Application No. 2007-537548). The storage apparatus holds write-targeted data in response to a write command from an access source in the cache memory, reads from the cache memory read-targeted data in response to a read command from the access source and provides this read-targeted data to the access source. Consequently, enhanced I/O (Input/Output) performance (for example, the data transfer rate) can be expected.

SUMMARY

The state of I/O from the access source is not always fixed. For this reason, there is a possibility that I/O performance will decline.

An object of the present invention is to prevent a drop in I/O performance resulting from a change in I/O status.

A cache control apparatus is provided in a computer system including an access source and a storage apparatus.

The access source issues an I/O command. As the access source, for example, a host apparatus or a computer program (for example, an application program or an operating system) that is executed by the host apparatus may be used.

The storage apparatus includes a plurality of storage devices, and a controller including a cache memory. The cache memory includes an allocated cache area. The controller executes data input/output in response to an I/O command from an access source. The controller uses the cache area at this time.

The cache control apparatus includes a storage resource, and a processor that is coupled to this storage resource. The above-mentioned storage resource stores cache utilization status information, which is information denoting the cache utilization status related to the cache area, and I/O status information, which is information denoting the status of I/O according to an I/O command from the access source. This information may be collected by the processor, or may be inputted from an external device.

The processor executes the following processes (X) and (Y):

(X) Determines whether or not the I/O performance of the access source has deteriorated based on the I/O status information; and (Y) In a case where the result of the determination in the above (X) is affirmative, executes cache control so as to change the cache utilization status specified from the cache utilization status information to a cache utilization status for improving I/O performance.

A number of factors are conceivable as causes for the result of the determination in the above-mentioned (X) being affirmative, but the following two causes are given particular consideration:

(Cause 1) The utilization status of the cache area is not suited to the I/O characteristics; and (Cause 2) The utilization status of the cache area is suited to the I/O characteristics, but the total capacity of the allocated cache area is insufficient.

A method for solving for (Cause 1) might be to correct the utilization status of the cache area inside the storage apparatus. Specifically, for example, a method for executing either process (a) or (b) below to control the cache can be considered:

(a) Make even more of the read data that exists in the cache area resident data; or (b) Change the cache mode for the cache area to a different mode that increases the data that is made to reside in the cache area.

By contrast, a method for solving for (Cause 2) might be to additionally allocate a new cache area. Specifically, for example, a method for executing either process (c) or (d) below to control the cache can be considered:

(c) Additionally allocate a first surplus cache area, which is an unallocated cache area; or (d) Release at least a portion of another cache area, and additionally allocate a second surplus cache area, which is the released portion.

It is preferable that the above-mentioned first and/or second surplus cache memory be a apparatus on a path from the access source to the storage apparatus, and be a higher level apparatus than the storage apparatus, for example, the cache memory inside a relay apparatus for relaying communications between the access source and the storage apparatus. Specifically, for example, in a case where the entire area of the cache memory 1106 inside the storage apparatus 1105 has been allocated as the cache area as shown by the gray area in FIG. 11A, it is preferable that as shown by the gray area in FIG. 11B a first (or second) surplus cache area of the cache memory 1102 inside the relay apparatus 1101 be additionally allocated. In accordance with this, in a case where read-targeted data desired by the access source 1103 exists in the cache area (the additionally allocated surplus cache area) of the cache memory 1102 inside the relay apparatus 1101, the read-targeted data will be provided to the access source 1103 from this cache area. This enhances I/O performance.

Further, a volume migration is also considered as a cache control. Specifically, for example, is a case where the entire area of the cache memory 1106 inside the storage apparatus 1105 has been allocated to the access source 1103 as the cache area as shown by the grey area in FIG. 12A, it is supposed that a logical volume #1 that is used by the access source 1103 is migrated from the storage apparatus 1105 to another storage apparatus 2105 as shown in FIG. 12B (for example, in a case where data (dirty data), which is not stored in the logical volume #1, exists in the cache memory 1106, this data is stored in the logical volume #1). After the migration, as shown in FIG. 12B, of the data stored in the cache memory 1106, the data that has been input/output to/from the logical volume #1 becomes unnecessary. For this reason, subsequent to the logical volume #1 being migrated, the cache memory 1106 is able to store even more data for input/output to/from a logical volume #2. Therefore, the I/O performance of data with respect to the logical volume #2 can be expected to improve.

The processor is able to carry out the above-described processing in accordance with executing a computer program, and this computer program may be installed from a remote server or may be installed from a storage medium (for example, a CD-ROM, DVD (Digital Versatile Disk) or other

BRIEF DESCRIPTION OF THE DRAWINGS

FIG. 4 shows a cache management table 401;

FIG. 5A shows a migration management table 501;

FIG. 5B shows dataset information 511;

FIG. 10 shows the flow of processing for the volume migration of S905;

DETAILED DESCRIPTION OF THE EMBODIMENTS

Figure 1:
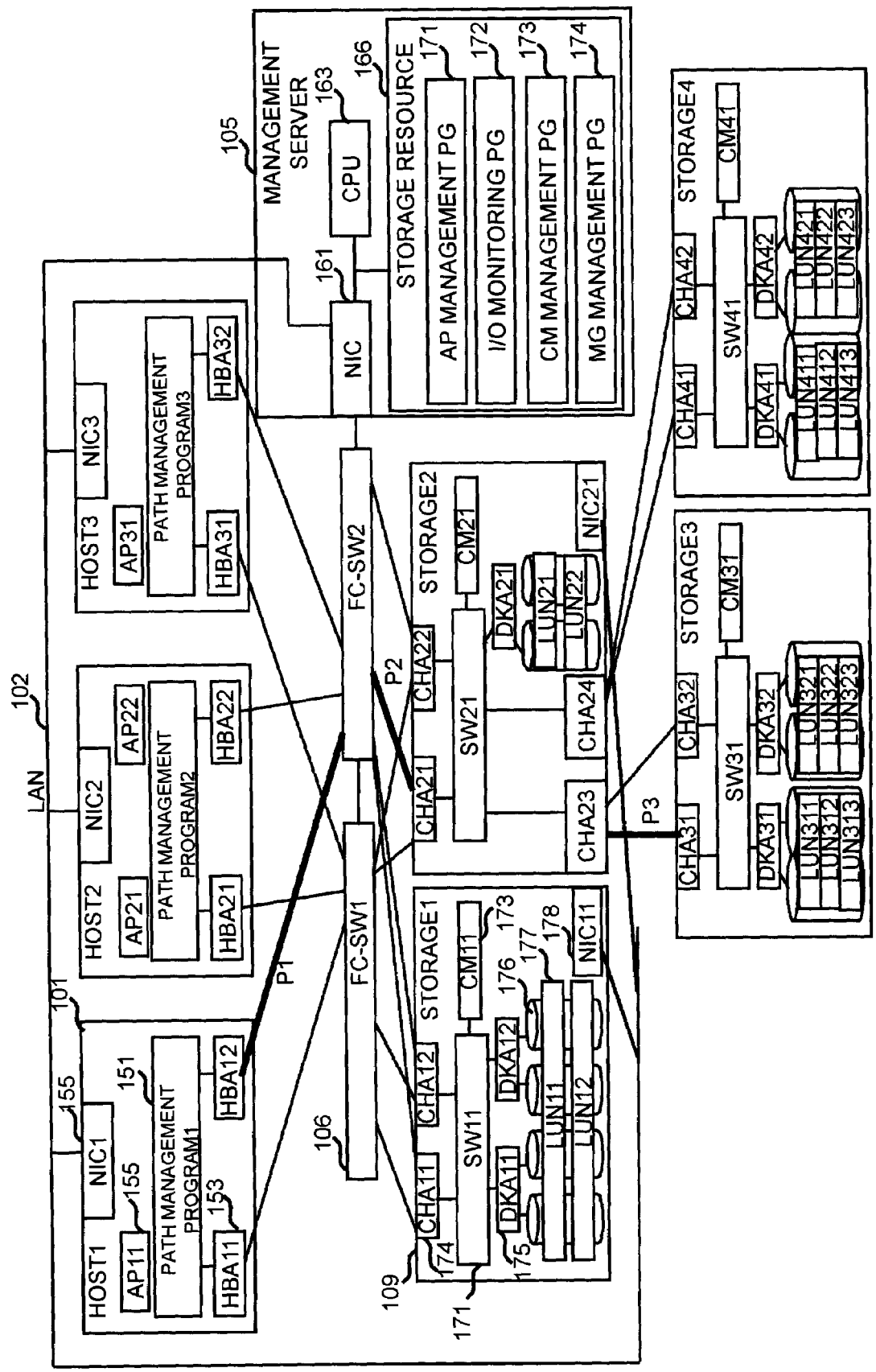
FIG. 1 shows a computer system related to one embodiment of the present invention.

One embodiment of the present invention will be explained below by referring to the drawings. Furthermore, in the following explanation, there is information that is expressed as "xxx table", but information may also be expressed using a data structure other than a table. Further, the processing that a computer program executes below is actually executed by the processor that executes this program.

FIG. 1 shows a computer system related to one embodiment of the present invention.

A host apparatus (referred to as host below) 101, a fibre channel switch apparatus (referred to as FC-SW below) 106, a storage apparatus (referred to as storage below) 109, and a management server 105 are coupled to a LAN (Local Area Network) 102. However, an external storage, which will be explained further below, does not have to be coupled to the LAN 102.

A SAN (Storage Area Network) includes a FC-SW 106. A host 101 and a storage 109 are coupled to the FC-SW 106. However, the external storage, which will be explained further below, need not be coupled to the LAN 102. At least one of the SAN and LAN may be a different type of communication network. Further, a single communication network may be used instead of the SAN and LAN.

The host 101 includes a communication interface device (for example, a NIC (Network Interface Card) 156, a HBA (Host Bus Adapter) 153), a CPU (Central Processing Unit) and a storage resource. The storage resource, for example, stores an application program (referred to as AP below) 156 and a path management program 151, and the CPU executes these programs 155 and 151.

The FC-SW 106 relays communications between the host 101 and the storage 109. The FC-SW 106 may include a cache memory and a cache function for controlling the use of the cache memory.

The storage 109 includes a controller and a group of magnetic disks.

The group of magnetic disks includes a RAID (Redundant Array of Independent (or Inexpensive) Disks) group. The RAID group includes two or more magnetic disks 176. Either one or a plurality of logical volumes 177 are created on the basis of the RAID group. For example, a LUN (Logical Unit Number) is allocated to the logical volume 177 as an identifier. The magnetic disk 176 is a typical hard disk drive, but a different type of nonvolatile storage device, such as a flash memory, may be used instead of this hard disk drive.

The controller controls the I/O for the host 101. The controller, for example, includes a CPU and a cache memory (referred to as CM below) 173. Specifically, for example, the controller includes a channel adapter (referred to as CHA below) 174, a disk adapter (referred to as DKA below) 175, a CM 173, a NIC 178 and a switch apparatus (referred to as SW below) 171.

The CHA 174 is a front-end interface device and controls communications with the host 101. The CHA 174 includes a CPU. The CHA 174 receives an I/O command from the host 101, and processes this I/O command.

The DKA 175 is a back-end interface device and controls communications with the magnetic disk 176. The DKA 175 includes a CPU. The DKA 175 accesses the magnetic disk 176 that forms the basis for a logical volume 177 corresponding to a LUN specified in an I/O command from the host 101.

The CM 173 stores data (either write-targeted data or read-targeted data) according to an I/O command from the host 101. A plurality of cache areas are defined on the basis of the CM 173.

The NIC 178 controls communications via the LAN 102. The NIC 178, for example, is coupled to any CHA 174.

A SW 11 is coupled to the CHA 174, the DKA 175 and the CM 173, and controls communications among the CHA 174, the DKA 175 and the CM 173.

The controller manages the cache utilization status at respective times for each cache area. As cache utilization states, for example, there are a cache hit rate (a read hit rate and write hit rate), a write ratio, a resident track read ratio, a capacity, and a cache mode. These will be explained further below.

Now then, according to FIG. 1, the names of elements of the same type are expressed by combining the name with a serial number. For example, there are expressions like host 1, host 2, host 3, AP 11, AP 21, . . . . In a case where no particular distinction is made between same type elements in the explanation below, the name and a reference numeral will be used, and in a case where the explanation makes a distinction between elements of the same type, a combination of the name and a serial number will be used instead of using the reference numeral. Whether the number following the name is a reference numeral or a serial number may be determined by how many digits the number has. An integer of three digits or more is a reference numeral, and an integer of no more than two digits is a serial number.

External storages 3 and 4 are coupled to the storage 2. The logical volume of the external storages 3 and 4 will be called an "external volume" below.

The storage 2 uses virtualization technology to centrally manage the logical volumes 311 through 313, 321 through 323, 411 and 412, and 421 through 423 of the external storages 3 and 4. In addition to the ordinary logical volumes (logical volumes that are based on magnetic disks) 21 and 22, the storage 2 also manages a virtual logical volume (referred to as the virtual volume below) and the corresponding relationship between the virtual volume and the external volume. Upon receiving an I/O command specifying the virtual volume, the storage 2 specifies the external volume corresponding to this virtual volume, and executes the I/O with respect to this external volume through either the CHA 23 or the CHA 24. For example, in a case where an I/O is executed with respect to the external volume 311 inside an external storage 3, the I/O-targeted data is held in the CM 31 inside the external storage 3. That is, in a case where I/Os are frequently executed with respect to the virtual volume, the I/Os are frequently executed with respect to the CM 31 and/or 41 inside the external storage 3 and/or 4.

According to this example, the storage 2 relays the communications between the host 101 and either external storage 3 or 4. For this reason, in this embodiment, it is also possible for the storage 2 to become a relay apparatus in addition to either FC-SW 1 or 2.

The function of each element will be explained below by giving as an example the accessing of the external volume 311 from the AP 11. It is supposed that the volume 311 is associated to a path (P1-P2-P3). Also, the virtual volume corresponding to the external volume 311 will be called "virtual volume 311" in the explanation that follows. Further, it is supposed that one of a plurality of cache areas based on the CM 31 has been allocated to the external volume 311. This one cache area will be called "cache area (T1)" in the explanation below.

The AP 11 issues an I/O command specifying the virtual volume 311 corresponding to the external volume 311.

The path management program 1 manages the path to the logical volume recognized by the host 1. For example, in a case where an I/O command specifying the virtual volume 311 has been issued from the AP 11, the path management program 1 outputs this I/O command for the HBA 12 associated to the path (P1-P2-P3).

The FC-SW 2 receives the I/O command specifying the virtual volume 311, and, in this case, transfers this I/O command to the CHA 21.

The storage 2 controller transfers this I/O command to the external storage 3. Specifically, the CHA 21 receives the I/O command specifying the virtual volume 311, and specifies that the volume specified by this I/O command is the virtual volume 311. In accordance with this, the CHA 21 changes this I/O command to an I/O command specifying the external volume 311 and sends this I/O command to the CHA 23 via the SW 21. The CHA 23 transfers this I/O command to the storage 3.

The external storage 3 controller (specifically, the CHA 31), upon receiving the I/O command specifying the external volume 311, determines whether or not there was a cache hit from the cache area (T1). A "cache hit" means that an I/O sub-area was detected inside the cache area (T1). In a case where the I/O command is a write command, the cache hit is a write hit, and the I/O sub-area is the area in which the write-targeted data conforming to this write command is stored. Conversely, in a case where the I/O command is a read command, the cache hit is a read hit, and the I/O sub-area is the area in which the read-targeted data conforming to this read command is stored.

In the case of a cache hit, the external storage 3 controller executes the I/O with respect to the detected I/O sub-area (an area inside the cache area (T1)). Specifically, for example, in a case where the I/O command is a write command, the controller writes the write-targeted data to the I/O sub-area, and thereafter, writes this write-targeted data from the cache area (T1) to the external volume 311. Conversely, in a case where the I/O command is a read command, the controller reads the read-targeted data from the I/O sub-area and transfers this data to the storage 2. This data is sent from the storage 2 to the AP 11 via the FC-SW 2 (that is, the read-targeted data is sent to the AP 11 via the path (P1-P2-P3)).

In a case where there is no cache hit (in the case of a cache miss), for example, the following processing is executed. For example, in a case where the I/O command is a write command, the controller reserves an area in which clean data (data already stored in external volume 311) is stored as the I/O sub-area, and writes the write-targeted data to this area (this write-targeted data is written from this area to the external volume 311 thereafter). Conversely, in a case where the I/O command is a read command, the controller reserves an I/O sub-area in the cache area (T1), reads the read-targeted data from the external volume 311, and holds this data in the reserved I/O sub-area. Thereafter, the controller reads the read-targeted data from the I/O sub-area and transfers this data to the storage 2.

The management server 105 will be explained next.

The management server 105 is a computer that serves as an example of a cache control apparatus. The management server 105 includes an NIC 161 for communications via the LAN 102; a storage resource 166 for storing a computer program and information; and a CPU 163, which is coupled to the NIC 161 and the storage resource 166. Another communication interface device may be used instead of the NIC 161 in accordance with the type of communication network and communication protocol.

The computer programs stored by the storage resource 166, for example, may include an application management program (abbreviated as "AP management PG" in the drawing) 171; an I/O monitoring program (abbreviated as "I/O monitoring PG" in the drawing) 172; a cache management program (abbreviated as "CM management PG" in the drawing) 173; and a migration management program (abbreviated as "MG management PG" in the drawing) 174.

The application management program 171 manages the required I/O performance for each AP. Specifically, for example, the application management program 171 manages the required I/O performance based on information from each AP. "Required I/O performance" is the performance required by the AP 11 as the performance for executing the I/O with respect to the virtual volume (external volume) 311. Incidentally, the I/O performance, for example, is the data transfer rate. The I/O performance, for example, is determined based on the data size in accordance with the I/O command and the response time corresponding to this I/O command. Specifically, for example, in a case where the data size is "10" and the response time (the time from the issuing of the I/O command until the processing of this I/O command is complete) is "5", the I/O performance becomes "2" (10÷5). Also, for example, in a case where the data size is "10" and the response time is "10", the I/O performance becomes "1".

The I/O monitoring program 172 monitors the actual performance of an I/O (the measured I/O performance) that each AP executes with respect to a logical volume.

The cache management program 173 determines, on the basis of the required I/O performance and measured I/O performance, whether or not a measured I/O performance will in time fall below the required I/O performance. In a case where the result of this determination is affirmative, the cache management program 173 determines the type of cache control that is needed, and executes the determined cache control.

The migration management program 174 executes the volume migration. The volume migration, as will be described below, may become a cache control for improving the measured I/O performance.

Each of the programs 171 through 174 will be explained in detail below.

First, the AP management program 171 will be explained.

Figures 2A, 2B:
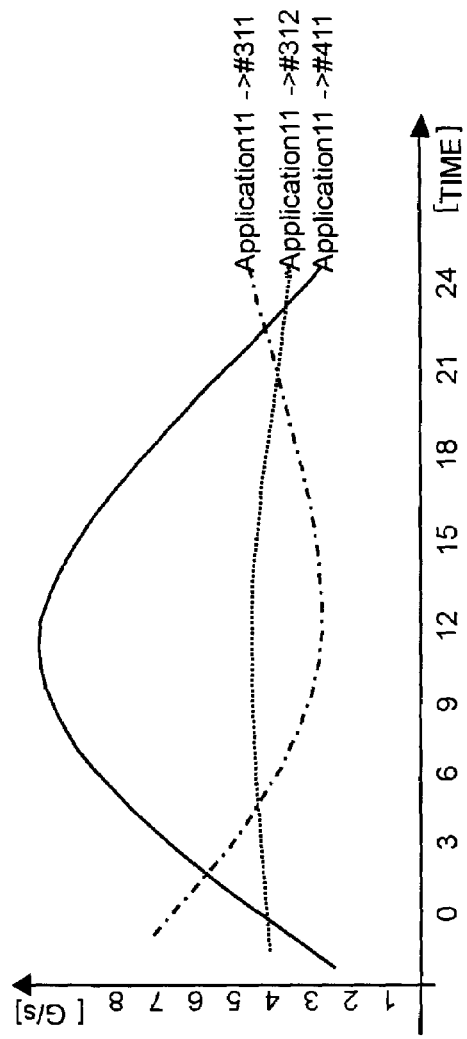
FIG. 2A shows an AP information management table 201.
FIG. 2B shows differences in required I/O performance in accordance with time.

The AP management program 171 regularly executes the following processes (A-1) and (A-2):

(A-1) Acquires information denoting the I/O performance of each AP via the LAN 102 from each host; and (A-2) Stores the information denoting the required I/O performance computed on the basis of the acquired information in an AP information management table 201 shown in FIG. 2A.

Table 201 is information managed by the AP management program 171 and is stored in the storage resource 166. The table 201, as shown in FIG. 2A, includes the following information elements (a-1) through (a-4) for each AP/volume set (a set made up of an AP and the logical volume that is the I/O destination of this AP):

(a-1) An AP name belonging to the AP/volume set;

(a-2) A time at which the required I/O performance was measured for this AP/volume set;

(a-3) The LUN allocated to the logical volume belonging to this AP/volume set; and (a-4) The required I/O performance for this AP/volume set. In other words, the table 201 is a log (statistical data) of the required I/O performance for each AP/volume set. The required I/O performance for each AP/volume set, for example, will differ in accordance with the time as shown in FIG. 2B. The required I/O performance at each time is computed and stored in the table 201. For this reason, referring to the table 201 reveals the changes in the required I/O performance for each AP/volume set.

The required I/O performance, as described above, is managed by the management server 105 on the basis of the information from each AP. For example, information is regularly acquired from each AP. Furthermore, the I/O performance acquired by the I/O monitoring program 172 may be used to compute the required I/O performance.

The preceding has been an explanation of the AP management program 171. Next, the I/O monitoring program 172 will be explained.

Figures 3A, 3B:
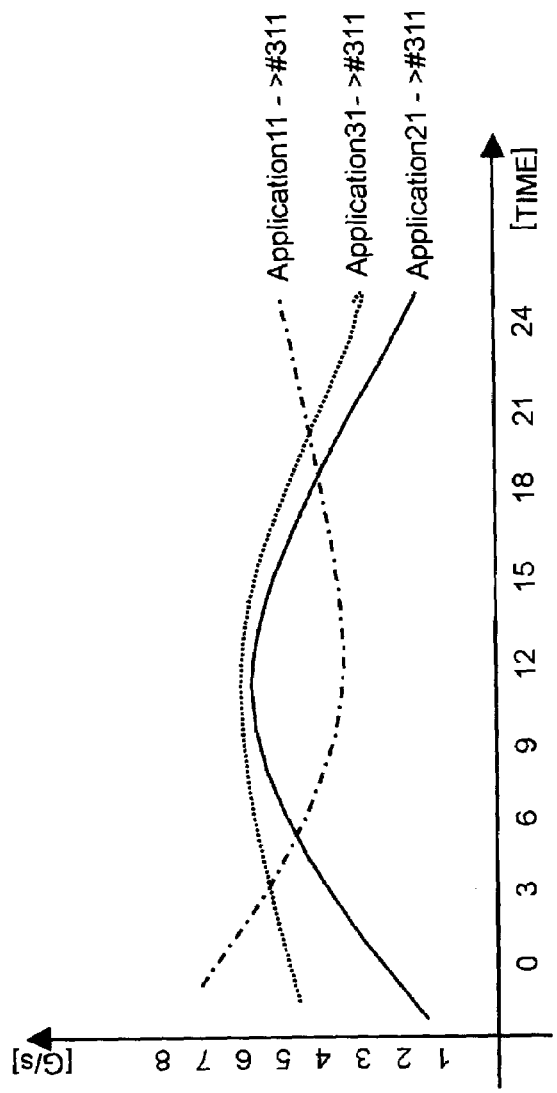
FIG. 3A shows an I/O monitoring table 301.
FIG. 3B shows differences in measured I/O performance in accordance with time.

The I/O monitoring program 172 regularly executes the following processing of (B-1) and (B-2):

(B-1) Acquires information denoting the measured I/O performance of each AP/volume set; and (B-2) Stores the acquired information in an I/O monitoring table 301 shown in FIG. 3A.

The I/O monitoring program 172 measures and manages the I/O performance of each AP/volume set.

The table 301 is information managed by the I/O monitoring program 172 and is stored in the storage resource 166. The table 301, as shown in FIG. 3A, includes the following information elements (b-1) through (b-5) for each AP/volume set:

(b-1) The LUN allocated to the logical volume belonging to this AP/volume set;

(b-2) An AP name belonging to this AP/volume set;

(b-3) A time at which the measured I/O performance was measured for this AP/volume set;

(b-4) The measured I/O performance for this AP/volume set; and (b-5) The I/O increasing rate for this AP/volume set. In other words, the table 301 is a log (statistical data) of the measured I/O performance and the I/O increasing rate for each AP/volume set. The measured I/O performance, for example, is acquired regularly. The measured I/O performance will differ (that is, the I/O status changes) in accordance with the time for each AP/volume set as shown in FIG. 3B. The I/O increasing rate may be computed by each host and/or each storage, and may also be computed by the I/O monitoring program 172. Specifically, for example, the I/O increasing rate is computed by the I/O monitoring program 172 calculating {(current measured I/O performance)÷(measured I/O performance of immediately preceding time)× 100}.

The preceding has been an explanation of the I/O monitoring program 172. Next, the cache management program 173 will be explained.

The cache management program 173 manages the cache area of each device including a cache function. In other words, the cache management program 173 is able to manage all the cache areas that exist in the computer system including the management server 105. That is, in a case where the FC-SW 106 includes a cache memory and a cache function, the cache management program 173 is able to manage not only the cache area inside the storage 109, but also the cache area inside the FC-SW 106. In this embodiment, the FC-SW 106 does not have a cache function, and therefore, the cache areas inside the storages 1 through 4 are managed.

The cache management program 173 regularly executes the following processing of (C-1) and (C-2):

(C-1) Acquires management information comprising information denoting the cache utilization status of each cache area via the LAN 102 from each device (each storage) including a cache function; and (C-2) Stores a predetermined time of the information element specified from the acquired management information in a cache management table 401 shown in FIG. 4.

The table 401 is information managed by the cache management program 173 and is stored in the storage resource 166. The table 401, as shown in FIG. 4, includes the following information elements (c-1) through (c-7) for each cache area:

(c-1) A cache area ID;

(c-2) The read hit rate for this cache area;

(c-3) The write hit rate for this cache area;

(c-4) The write ratio for this cache area;

(c-5) The resident track read ratio for this cache area;

(c-6) The capacity for this cache area; and (c-7) The cache mode utilized for this cache area.

The cache utilization status related to each cache area that exists in the computer system is managed in the table 401 like this. The above-mentioned information elements (c-1) through (c-7) are included in the management information acquired from each storage. The respective cache areas managed in the table 401 are allocated to any AP/volume set. Which cache area is allocated to which logical volume is managed separately by the cache management program 173. An address range that has not been allocated as a cache area of the cache memory that exists in the computer system (the area corresponding to this address range being referred to as the "pool cache area" below) is also managed separately by the cache management program 173.

The cache area ID, for example, comprises information (for example, a storage name) related to the storage including this cache area. Consequently, the storage to which this cache area belongs is evident from the cache area ID. Furthermore, the ID of the device that includes the cache area may be managed separately from the cache area ID.

The information elements (c-2) through (c-7) are included in the information denoting the cache utilization status. The information elements (c-2) through (c-5) may also be measured in each storage for each time period. Or, I/O processing log information (for example, information denoting what I/O command was received when, and whether or not there was a cache hit for this I/O command) may be included in the management information from each storage, and the cache management program 173 may compute the information elements (c-2) through (c-5) based on this I/O processing log information.

The information elements (c-2) through (c-5), that is, the read hit rate, the write hit rate, the write ratio, and the resident track read ratio will be explained below. To make the explanation easier to understand, the cache area identified from the cache ID "STORAGE3 CLPR31" at this time, that is, the cache area inside the external storage 3 (referred to as cache area (T2) below) will be given as an example. It is supposed that the cache area (T2) has been allocated to the volume 321. A write command specifying the volume 321 will be called the "specified write command", and a read command specifying the volume 321 will be called the "specified read command".

The "read hit rate" is the probability of a read hit in the cache area (T2). Specifically, the read hit rate during a certain period is the ratio of the number of specified read commands that resulted in read hits from among the total number of specified read commands received during this period.

The "write hit rate" is the probability of a write hit in the cache area (T2). Specifically, the write hit rate during a certain period is the ratio of the number of specified write commands that resulted in write hits from among the total number of specified write commands received during this period.

The "write ratio" is the ratio of specified write commands from among the specified I/O commands. Specifically, the write ratio of a certain period is the ratio of the number of specified write commands from among the total number of specified I/O commands received during this period.

The "resident track read ratio" is the ratio at which read data that has been made resident is read. Specifically, for example, the resident track read ratio of a certain period is the ratio of the number of specified read commands, which had resident read data as the read target, from among the total number of specified read commands received during this period. Furthermore, "read data" is data that has been read to the cache area from the magnetic disk in response to a read command. For this reason, in the case of a read hit, any of the read data that exists in the cache area is read from the cache area as the read target. By contrast, the data that is sent from the AP and written to the cache memory is the "write data". For this reason, the write data is not only the write-targeted data written to the cache area in accordance with a write command, but also the data that has been written in accordance with a past write command.

Next, the cache mode will be explained.

The cache mode is set for each cache area. The controller inside each storage uses the cache area in accordance with the cache mode that has been made correspondent to this cache area. The cache mode may be broadly divided into two types: a dynamic mode and a static mode.

The dynamic mode is the mode in which the data in the cache area is dynamically made to reside in the cache area. For example, there are two types of dynamic mode, a B-mode and a P-mode.

The B-mode is the mode in which both write data and read data are made to reside in the cache area. Specifically, write-targeted data in the cache area is made resident in a write process. The reflection of this write-targeted data in the magnetic disk is implemented when the power is shut off. Conversely, read-targeted data that is read from the cache area is made resident in the read process. Data that has been made to reside in the cache memory is not updated even after this data has been reflected in the magnetic disk.

The P-mode is the mode in which the read data is made to reside in the cache area but the write data is not made to reside in the cache area. Data that is not made resident in the cache area may be updated. Specifically, for example, in a case where a write command for updating the write data in the cache area is received and the area in which this write data is stored has not been reserved, making it impossible to store the write-targeted data in accordance with this write command, the write data in the cache area is written over by this write-targeted data.

The static mode is the normal mode in which data is not made to reside in the cache area. For this reason, for example, the read hit rate in this mode is lower than that for the dynamic mode.

The preceding has been an explanation of the cache management program 173. Next, the migration management program 174 will be explained.

The migration management program 174 registers a schedule related to the migration of each volume in a migration management table 501 shown in FIG. 5A.

The table 501 is information managed by the migration management program 174 and is stored in the storage resource 166. The table 501, as shown in FIG. 5A, includes the following information elements (d1) through (d5) for each migration:

(d1) A scheduled migration start time;
(d2) The ID of the storage including the migration-targeted logical volume;
(d3) The LUN of the migration-targeted logical volume;
(d4) The ID of the RAID group (migration-source RG) that is the basis of the migration-targeted logical volume; and
(d5) The ID of the migration-destination RAID group (migration-destination RG).

The migration-destination RG exists in a different storage than the storage including the migration-source RG. The storage including the migration-destination RG will be called the "migration-destination storage" below, and the storage including the migration-targeted logical volume will be called the "migration-source storage".

The migration management program 174 sends a migration instruction based on information recorded in a record of table 501 to the migration-source storage (and/or the migration-destination storage). The storage, which receives this instruction, executes a migration at the scheduled migration start time. In a migration of this embodiment, the following processing of (m1) and (m2) is executed:

(m1) The data inside the migration-targeted logical volume is copied to the logical volume based on the migration-destination RG; and
(m2) The LUN allocated to the migration-targeted logical volume is allocated to the migration-destination logical volume.

Consequently, the I/O command specifying the LUN allocated to the migration-targeted logical volume is sent to the migration-destination storage. Also, the input/output of data in accordance with this I/O command is executed to/from the cache area inside the migration-destination storage.

The preceding has been an explanation of the migration management program 174. The flow of processing executed in this embodiment will be explained below.

Figure 6:
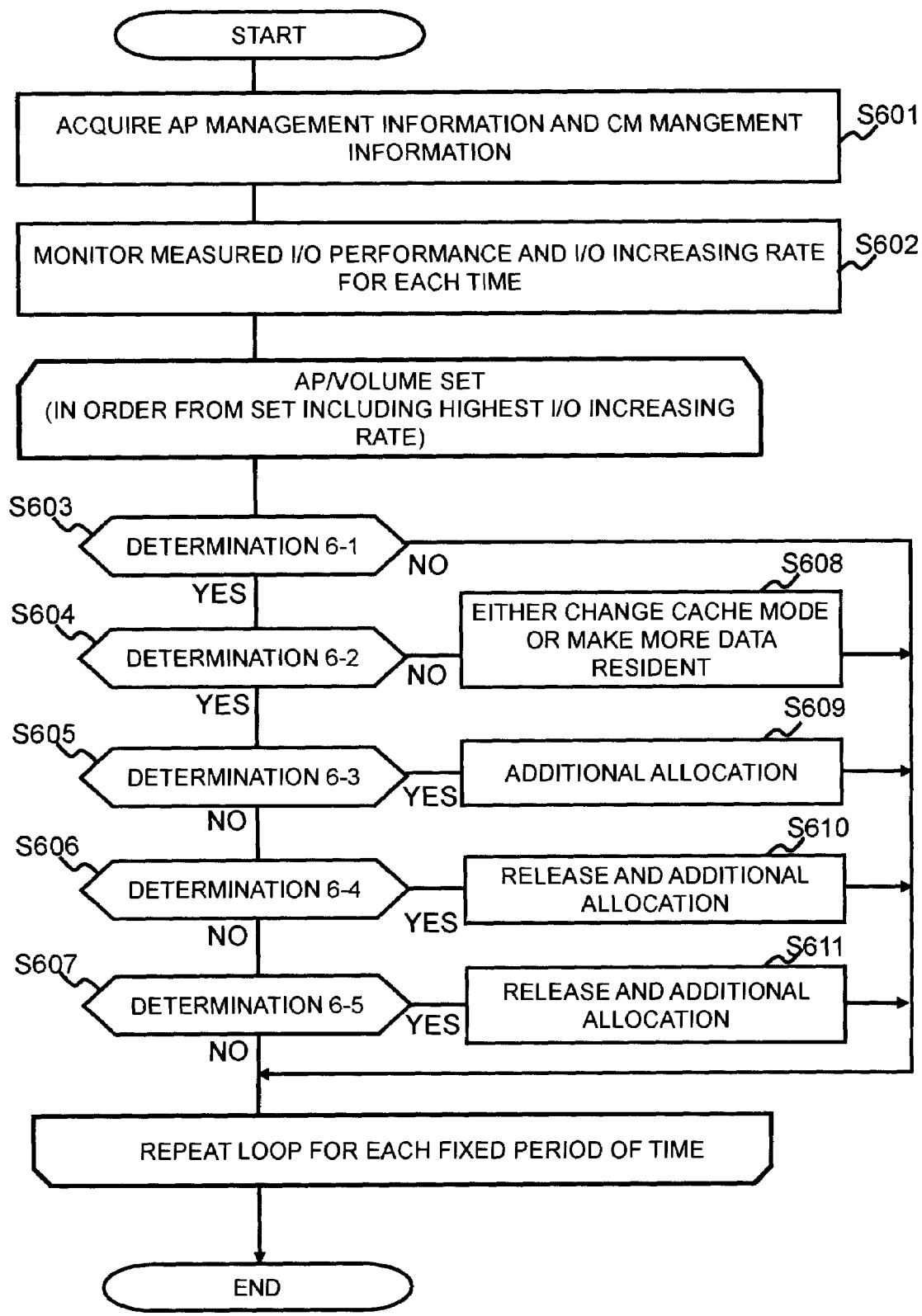
FIG. 6 shows the flow of processing for managing a cache.

FIG. 6 shows the flow of processing for managing the cache.

In S601, the application management program 171 acquires AP management information related to the respective applications from each host and registers the various information elements specified from this information in the application management table 201. Also, the cache management program 173 acquires the CM management information (the information denoting the cache utilization status of each cache area, and the information comprising the dataset information) from each storage, and registers the various information elements specified from the management information in the cache management table 401. S601, for example, is executed regularly.

Furthermore, the dataset information, for example, is as shown in FIG. 5B. That is, the dataset information 511 denotes I/O characteristics for each logical volume. Specifically, for example, the dataset information 511 includes information denoting the I/O characteristics as to whether reads or writes were executed more often for each LBA (Logical Block Address) range of the logical volume for each logical volume. That is, the storage controller manages whether reads or writes are executed more often for each LBA range of the logical volume for each logical volume. Furthermore, values denoting the respective frequencies of the reads and writes for each LBA range may be included in the dataset information.

Refer to FIG. 6 once again.

In S602, the I/O monitoring program 172 acquires the measured I/O performance and the I/O increasing rate for each AP/volume set, and registers these information elements in the I/O monitoring table 301. S602, for example, is executed regularly.

Figure 7:
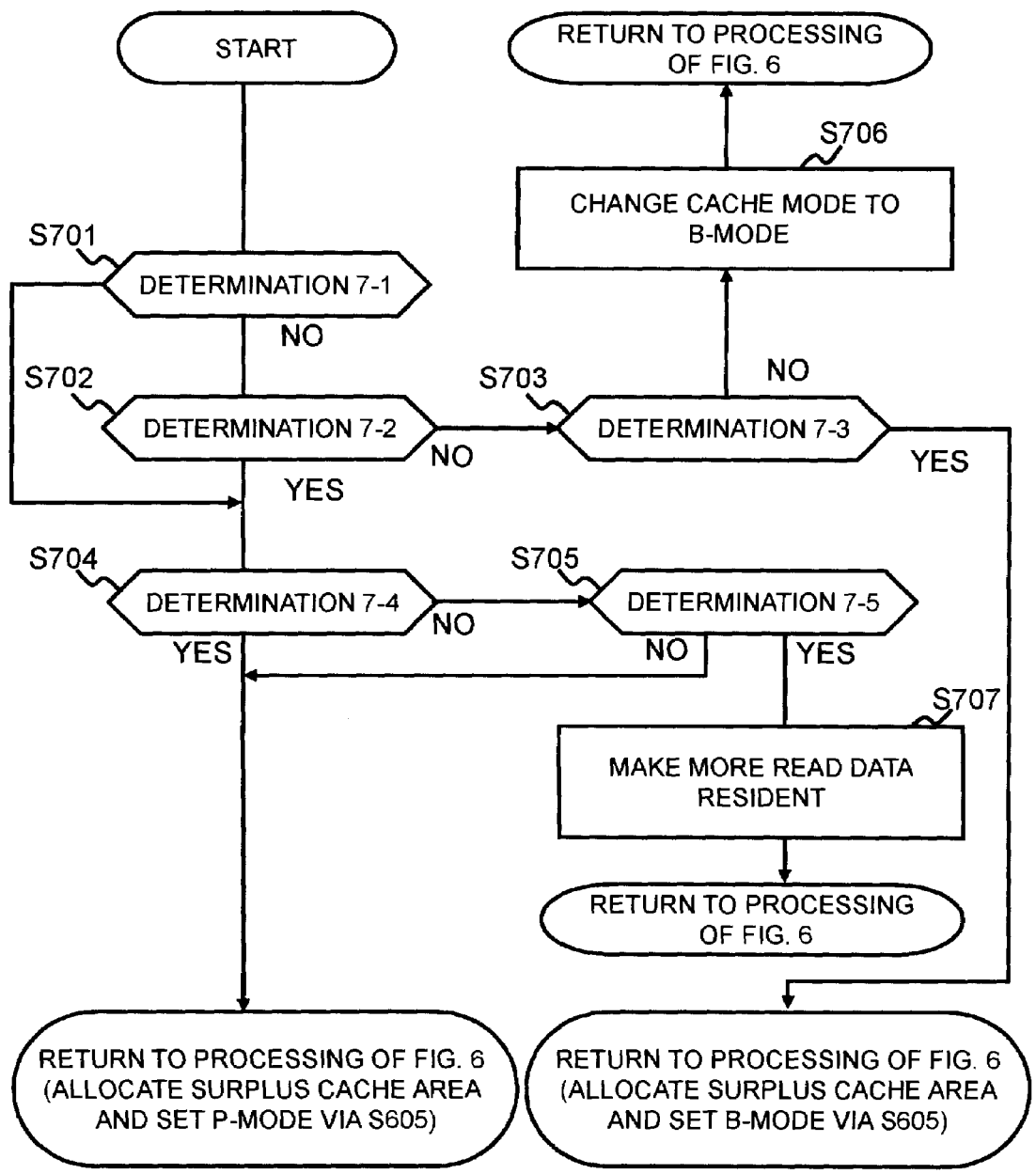
FIG. 7 shows S604 and S608 in detail.
Figure 8:
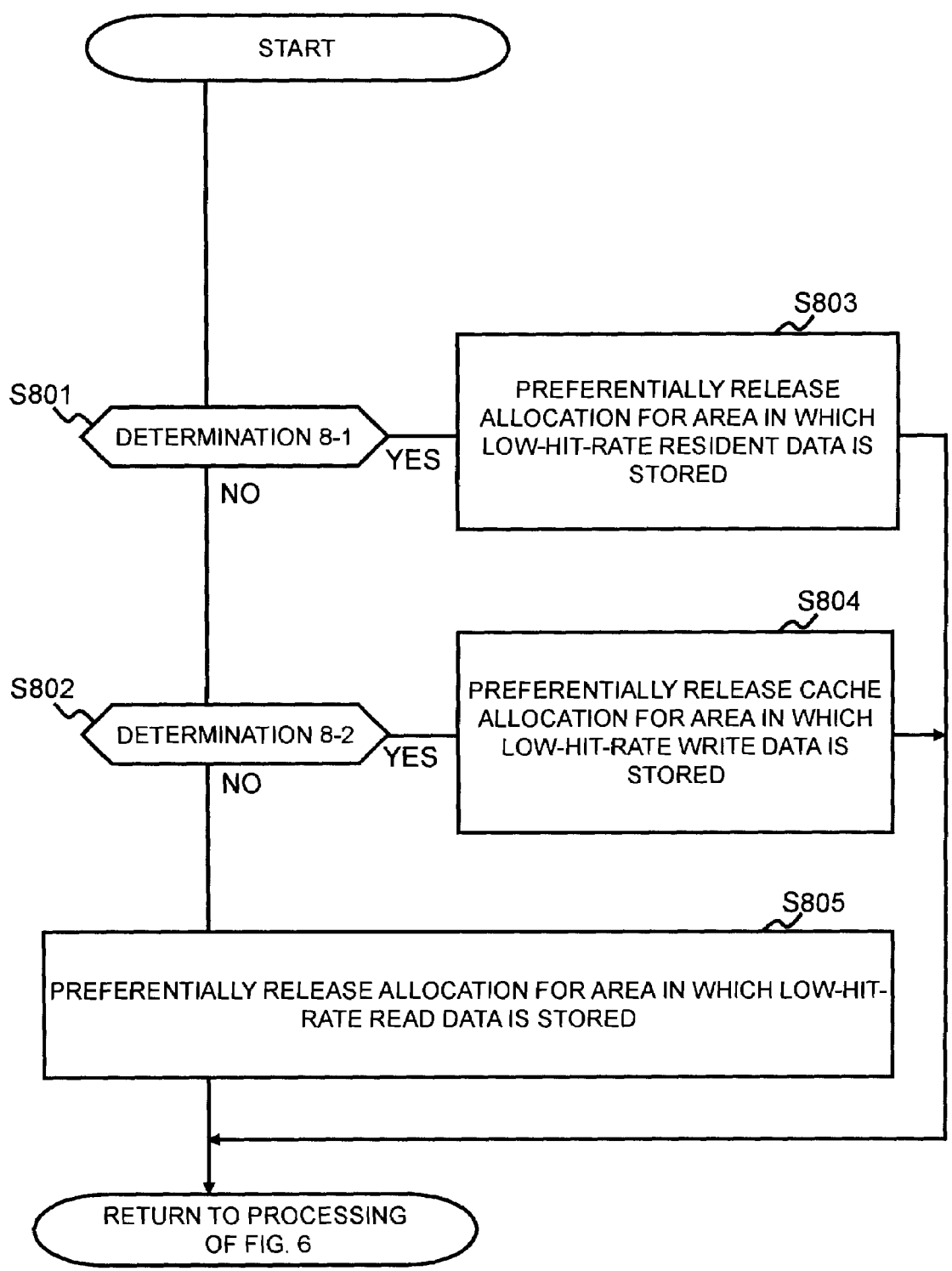
FIG. 8 shows the flow of processing for releasing an area.

A loop comprising S603 through S612 is executed for each AP/volume set. This loop is executed first from the AP/volume set including the highest I/O increasing rate. S603 through S611 will be explained by giving a single AP/volume set as an example. In the explanations of FIGS. 6 through 8 below, this AP/volume set will be called the "target set", the AP belonging to the target set will be called the "target AP", and the logical volume belonging to the target set will be called the "target volume". It is supposed that the target volume is the volume 311 inside the external storage 3, and that the virtual volume corresponding to this volume 311 is managed by the storage 2.

In S603, a determination 6-1 is made. In the determination 6-1, the cache management program 173 determines, based on the required I/O performance, the measured I/O performance and the I/O increasing rate corresponding to the target set, whether or not the measured I/O performance at a certain point in time in the future will fall below this required I/O performance. The "measured I/O performance at a certain point in time in the future", for example, is a value estimated by the program 173 based on the I/O increasing rate at the latest time and the measured I/O performance at the latest time. In a case where the result of the determination 6-1 is negative, the processing for the target set ends (that is, the cache control for changing the cache utilization status for the target set is not necessary), and S603 is executed for another AP/volume set including the next highest I/O increasing rate. By contrast, in a case where the result of the determination 6-1 is affirmative, S604 is executed.

In S604, a determination 6-2 is made. In the determination 6-2, the cache management program 173 determines whether cache utilization status is appropriate or not. In a case where the result of the determination 6-2 is negative, S608 is executed, and in a case where the result of the determination 6-2 is affirmative, S605 is executed.

In S605, a determination 6-3 is made. In the determination 6-3, the cache management program 173 determines whether or not at least a portion of the pool cache area (called the "first surplus cache area" below) is allocatable. In a case where the result of the determination 6-3 is affirmative, S609 is executed, and in a case where the result of the determination 6-3 is negative, S606 is executed. In a case where there is a pool cache area with a capacity that is greater than that deemed necessary for the first surplus cache area, the result of the determination 6-3 is affirmative.

In S606, a determination 6-4 is made. In the determination 6-4, the cache management program 173 determines whether or not there is an AP/volume set for which the measured I/O performance is excessively high (for example, an AP/volume set for which the measured I/O performance is greater than a certain threshold). This set will be called the "first surplus set" below. In a case where the result of the determination 6-4 is affirmative, S610 is executed, and in a case where the result of the determination 6-4 is negative, S607 is executed.

In S607, a determination 6-5 is made. In the determination 6-5, the cache management program 173 determines whether or not there is an AP/volume set for which the I/O increasing rate is low (for example, the I/O increasing rate is lower than a certain threshold) and the required I/O performance tends to decline (called the second surplus set below). In a case where the result of the determination 6-5 is affirmative, S611 is executed, and in a case where the result of the determination 6-5 is negative, the processing of this loop for the target set ends (that is, the cache control for changing the cache utilization status for the target set is unnecessary).

In S608, a cache control is executed. Specifically, the cache management program 173 either changes the cache mode for the cache area allocated to the target volume, or makes more of the cache area read data resident.

In S609, the cache management program 173 additionally allocates to the target volume the first surplus cache area of the required capacity from the pool cache area.

In S610, the cache management program 173 releases at least a portion of the cache area that has been allocated to the volume belonging to the above-mentioned first surplus set, and additionally allocates at least a portion of the released part (the released part will be called the "second surplus cache area" below) to the target volume.

In S611, the cache management program 173 releases a portion of the cache area that has been allocated to the volume belonging to the above-mentioned second surplus set, and additionally allocates at least a portion of the released part (the second surplus cache area) to the target volume.

In a case where the processing in this loop has been executed for all the AP/volume sets, processing exits this loop. Furthermore, this loop is executed at fixed times. That is, since information elements of a new time are registered in tables 201, 301 and 401 in accordance with S601 and S602, the loop is executed for all the AP/volume sets on the basis of the information elements of this new time. In a case where the I/O increasing rate of the new time differs from the I/O increasing rate of the previous time, the order of the AP/volume set (the order in which the processing within the loop is executed) will also differ from the previous order.

The above-described S609 will be explained in detail.

As described above, the "pool cache area" is an area corresponding to an address range that has not been allocated as a cache area of the cache memory that exists in the computer system. In S609, the cache area (the first surplus cache area) inside a device (a host side device), which is on the path between the target AP and the target volume, and which is at a higher level than the storage including the target volume is allocated preferentially over the cache area inside the storage including the target volume.

The cache management program 173 sends a surplus cache area allocation instruction (a cache allocation instruction) to the relay apparatus including the surplus cache area. The relay apparatus, for example, is the storage 2, but in a case where the FC-SW 2 has a cache function, the FC-SW 2 may be this relay apparatus. The cache allocation instruction from the cache management program 173, for example, comprises:

(K1) A target volume LUN;

(K2) A surplus cache area address range; and (K3) An LBA range corresponding to this address range (the target volume LBA range).

The device, which receives this instruction, holds the information elements (K1) through (K3) included in this instruction. The surplus cache area allocation consequently ends. Thereafter, for example, in a case where the relay apparatus receives an I/O command comprising the target volume LUN and the LBA and the address range corresponding to the LUN and the LBA included in the I/O command is an address range inside the cache memory of this relay apparatus, this relay apparatus executes the input/output of data in accordance with this I/O command to/from the area corresponding to this address range. For this reason, for example, in a case where the read-targeted data is being held in this area, the relay apparatus provides the held read-targeted data to the target AP in response to the I/O command.

Furthermore, the above explanation of the method for allocating the surplus cache area is not limited to the allocation of the first surplus cache area, but rather is also the same for a case in which the second surplus cache area (that is, the part released from the cache area allocated to the logical volume belonging to either the above-described first or second surplus set) is allocated to the target volume.

Next, the above-described S604 and S608 will be explained in detail by referring to FIG. 7.

The processing shown in FIG. 7 is the detailed processing of the above-described S604 and S608. Specifically, S701 through S705 of FIG. 7 is the detailed processing of S604, and S707 and S708 is the detailed processing of S608.

In S701, a determination 7-1 is made. In the determination 7-1, the cache management program 173 references the cache management table 401 and determines whether or not the read hit rate for the cache memory (called cache area (T3) below) allocated to the target volume is high (for example, whether or not this read hit rate is greater than a certain threshold). In a case where the result of the determination 7-1 is negative, S702 is executed, and in a case where the result of the determination 7-1 is affirmative, S704 is executed.

In S702, a determination 7-2 is made. In the determination 7-2, the cache management program 173 references the cache management table 401 and determines whether or not the write ratio for the cache area (T3) is high (for example, whether or not this write ratio is greater than a certain threshold). In a case where the result of the determination 7-2 is negative, S703 is executed, and in a case where the result of the determination 7-2 is affirmative, S704 is executed.

In S703, a determination 7-3 is made. In the determination 7-3, the cache management program 173 references the cache management table 401 and determines whether or not the cache mode for the cache area (T3) is the B-mode. In a case where the result of the determination 7-3 is negative, S706 is executed, and in a case where the result of the determination 7-3 is affirmative, S605 of FIG. 6 is executed.

In S704, a determination 7-4 is made. In the determination 7-4, the cache management program 173 references the cache management table 401 and determines whether or not the resident track read ratio for the cache area (T3) is high (for example, whether or not this resident track read ratio is greater than a certain threshold). In a case where the result of the determination 7-4 is negative, S705 is executed, and in a case where the result of the determination 7-4 is affirmative, S605 of FIG. 6 is executed.

In S705, a determination 7-5 is made. In the determination 7-5, the cache management program 173 determines whether or not there have been numerous reads and data has not been made to reside in the cache area (T3). As for whether data has not been made to reside in the cache area (T3), a determination is able to be made by referencing the sub-area management information included in the CM management information from the storage. The sub-area management information comprises information denoting whether or not data stored in the respective sub-areas (slots) of the cache area has been made resident. Further, as for whether or not there is data that is read often, for example, a determination is able to be made based on information (for example, information included in the above-mentioned CM management information) denoting which data in the cache area (T3) corresponds to which LBA range of the target volume, and the above-described dataset information. In a case where the result of the determination 7-5 is affirmative, S707 is executed, and in a case where the result of the determination 7-5 is negative, S605 of FIG. 6 is executed.

In S706, the cache management program 173 sends to the storage including the cache area (T3) a mode change instruction for changing the cache mode for the cache area (T3) to the B-mode. The B-mode is consequently set for the cache area (T3) in the storage including the cache area (T3), and thereafter, the cache area (T3) is used in the B-mode.

In S707, the cache management program 173 sends to the storage including the cache area (T3) a resident data instruction for making read data that is often read from among the read data that exists in the cache area (T3). More read data is consequently made to reside in the cache area (T3). The determination as to which of the read data is often read may be made based on information (for example, information included in the above-mentioned CM management information) denoting which data in the cache area (T3) corresponds to which LBA range of the target volume, and the above-described dataset information.

According to the above explanation based on FIG. 7, the following is clear.

That is, in a case where the read ratio is not high, the write ratio is not low, and the cache mode is not the B-mode with respect to the cache area (T3), the cache control involves changing the cache mode of the cache area (T3) to the B-mode.

Further, in a case where the read hit rate is high (or the read hit rate is not high, but the write ratio is low), the resident track read ratio is not high, and there is data that is read often but has not been made resident with respect to the cache area (T3), the cache control involves making more data resident.

In addition, in the case of any of the following (A) through (C) with respect to the cache area (T3):

(A) A case in which the read hit rate is high (or the read hit rate is not high, but the write ratio is low), and the resident track read ratio is high;

(B) A case in which the read hit rate is high (or the read hit rate is not high, but the write ratio is low), the resident track read ratio is not high, and data that is read often but has not been made resident does not exist; and (C) A case in which the read hit rate is not high, the write ratio is not low, and the cache mode is the B-mode, the first surplus cache area (the higher level cache area on the path between the target AP and the target volume) is additionally allocated to the target volume via S605. Furthermore, the capacity of the allocated first surplus cache area, for example, may be determined based on the required I/O performance, the measured I/O performance and the I/O increasing rate for the target set. In accordance with this, the capacity of the first surplus cache area can be counted on not to become needlessly large. In a case where the cache mode for the additionally allocated first surplus cache area in the above-mentioned (A) and (B) is the P-mode, the B-mode may be used in the case of the above-mentioned (C).

The cache release processing of the above-described S610 and S611 of FIG. 6 will be explained in detail.

FIG. 8 shows the flow of processing for releasing an area.

In S801, a determination 8-1 is made. In the determination 8-1, the cache management program 173 determines whether or not there is data, which is resident and has a low read hit rate in the cache area (will be called the release-retained cache area below) allocated to the logical volume belonging to the surplus set (either the first or second surplus set). It is possible to specify the hit rate (read hit rate/write hit rate) for each piece of data in the release-retained cache area from the above-mentioned sub-area management information (the information that comprises information denoting whether or not the data stored in the respective sub-areas (slots) of the cache area has been made resident). In a case where the result of the determination 8-1 is affirmative, S803 is executed, and in a case where the result of the determination 8-1 is negative, S802 is executed.

In S802, a determination 8-2 is made. In the determination 8-2, the cache management program 173 determines whether or not there is write data with a low write hit rate in the release-retained cache area. In a case where the result of the determination 8-2 is affirmative, S804 is executed, and in a case where the result of the determination 8-2 is negative, S805 is executed.

In S803, the cache management program 173 releases the preferential allocation from the area in which the resident data with the lowest read hit rate is stored.

In S804, the cache management program 173 releases the preferential allocation from the area in which the write data with the lowest write hit rate is stored.

In S805, the cache management program 173 releases the preferential allocation from the area in which the read data with the lowest read hit rate is stored.

In S803 through S805, the program 173, for example, sends to the device including the release-retained cache area an allocation release instruction for releasing the relevant part from the release-retained cache area. The allocation-released part is the above-described second surplus cache area. The capacity of the second surplus cache area, for example, may be determined based on the required I/O performance, the measured I/O performance and the I/O increasing rate with respect to the surplus set. In accordance with this, the capacity of the second surplus cache area can be counted on not to become needlessly large.

At least one portion of the second surplus cache area is additionally allocated to the target volume in either S610 or S611 of FIG. 6. The capacity of the allocated area, for example, may be determined based on the required I/O performance, the measured I/O performance and the I/O increasing rate with respect to the target set. In accordance with this, the capacity of the additionally allocated area can be counted on not to become needlessly large. In a case where only a portion of the second surplus cache area is additionally allocated, the remaining area may be managed as a pool cache area.

A migration management process is executed independently of the processing explained by referring to FIGS. 6 though 8.

Figure 9:
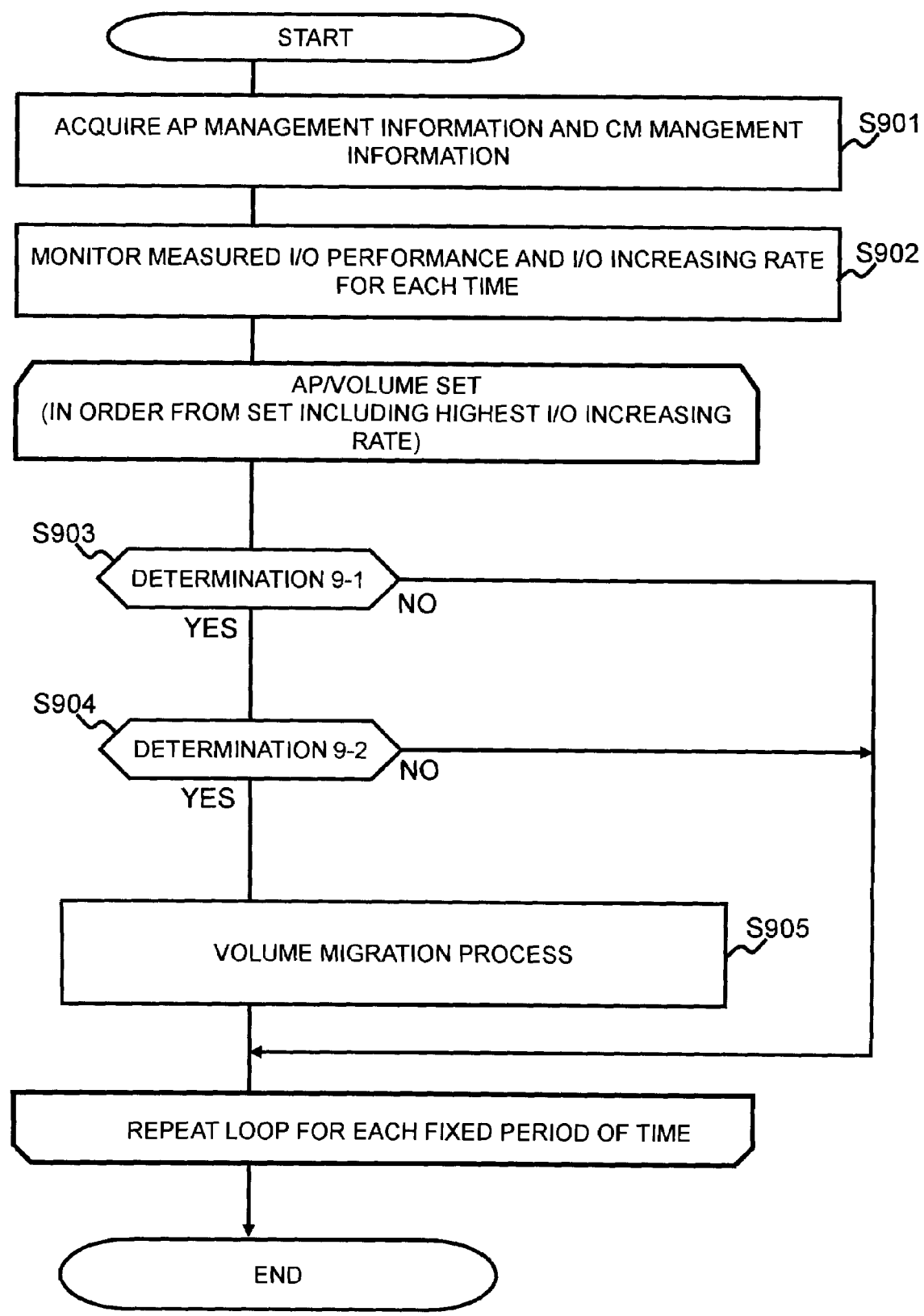
FIG. 9 shows the flow of processing for managing a migration.
Figure 11A:
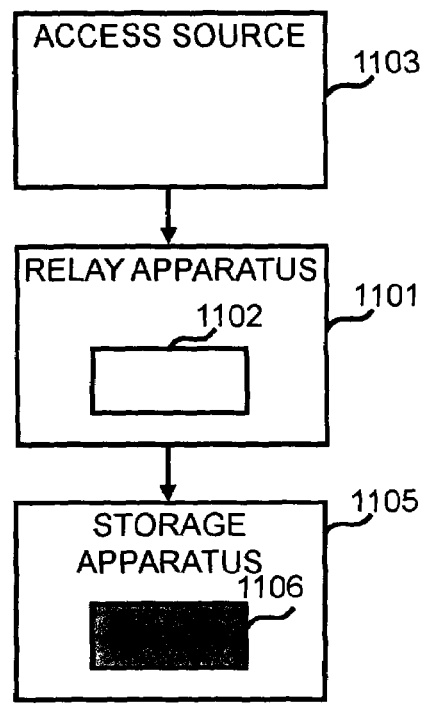
FIG. 11A shows a state in which an area of the cache memory inside a relay apparatus has not been allocated as a cache area.
Figure 11B:
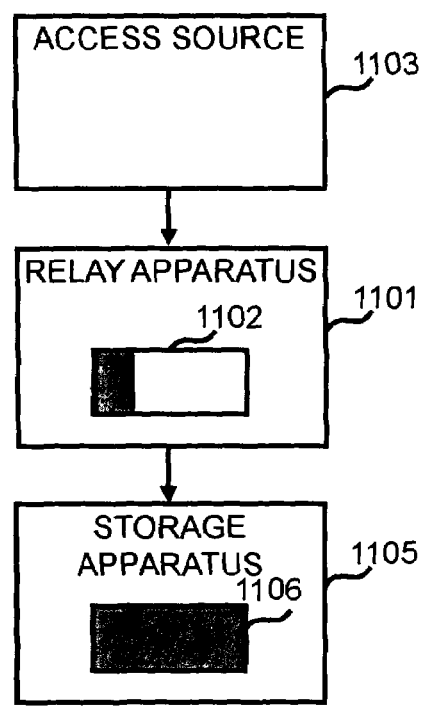
FIG. 11B shows a state in which an area of the cache memory inside the relay apparatus has been allocated as a cache area.
Figure 12A:
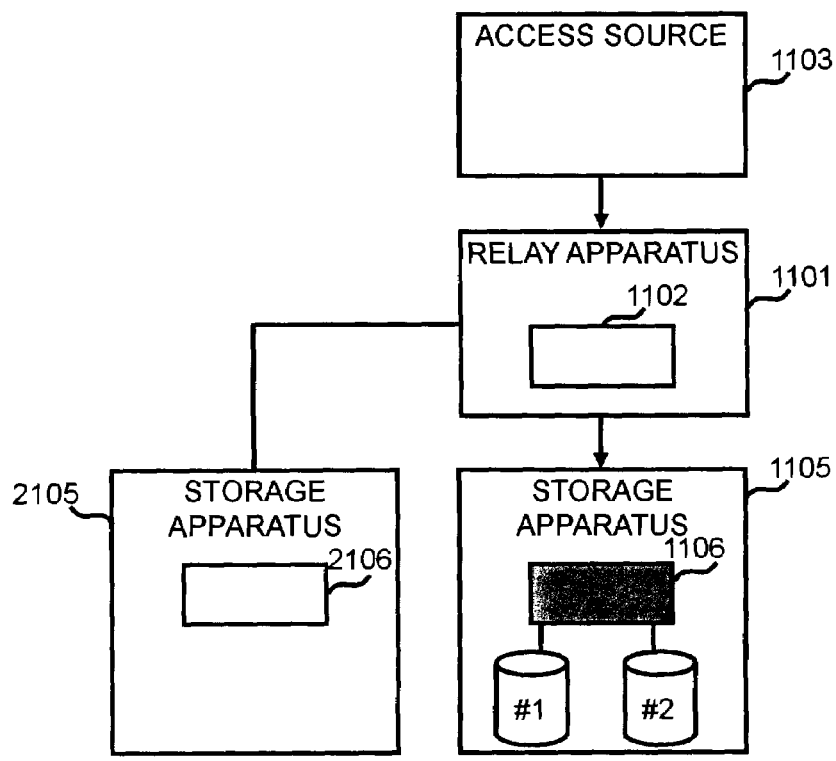
FIG. 12A shows the state prior to the volume migration.
Figure 12B:
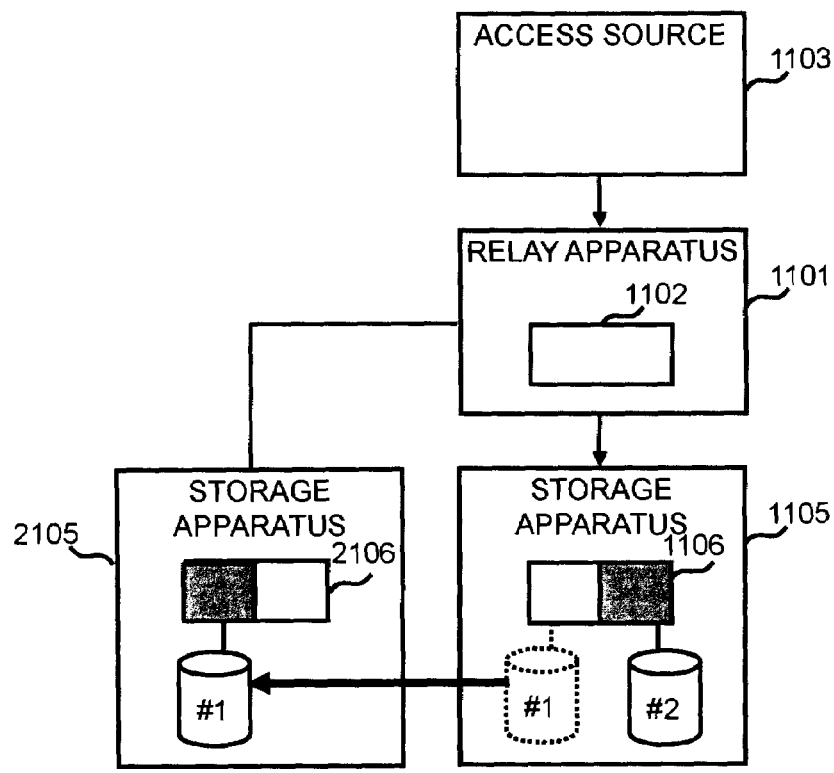
FIG. 12B shows the state after the volume migration.

FIG. 9 shows the flow of processing for a migration.

In S901 and S902, the same processing as that of S601 and S602 of FIG. 6 is executed. S901 and S902 may be S601 and S602 themselves, or may be processing that differs from this.

A loop comprising S903 through S905 is executed for each AP/volume set. This loop is executed first from the AP/volume set including the highest I/O increasing rate. S903 through S905 will be explained by giving a single AP/volume set as an example. In the explanations of FIGS. 9 and 10 below, this AP/volume set will be called the "target set", the AP belonging to the target set will be called the "target AP", and the logical volume belonging to the target set will be called the "target volume". It is supposed that the target volume is the volume 311 inside the external storage 3, and that the virtual volume corresponding to this volume 311 is managed by the storage 2.

In S903, a determination 9-1 is made. In the determination 9-1, the migration management program 174 determines whether or not the measured I/O performance at a certain point in time in the future will be lower than this required I/O performance using the same method as that of the determination 6-1 of FIG. 6. In a case where the result of the determination 9-1 is negative, the processing for the target set ends, and S903 is executed for a different AP/volume set including the next highest I/O increasing rate. By contrast, in a case where the result of the determination 9-1 is affirmative, S904 is executed.

In S904, a determination 9-2 is made. In the determination 9-2, the migration management program 174 determines whether or not the processing of FIG. 6 has been executed for the target set. In a case where the result of the determination 9-2 is affirmative, S905 is executed since measured I/O performance will drop even when the processing of FIG. 6 is executed. By contrast, in a case where the result of the determination 9-2 is negative, processing ends for the target set without S905 being executed since there is the likelihood that the measured I/O performance will not drop when the processing of FIG. 6 is executed with respect to the target set.

In S905, volume migration processing is executed.

Furthermore, the above-described determination 9-2 corresponds to the loop of S603 through S611 of FIG. 6. Specifically, for example, in a case where the result of the determination in S607 of FIG. 6 is negative (NO), the result of the determination 9-2 will also be negative (NO), and in a case where either the determination in S607 of FIG. 6 is not reached or the result of the determination in S607 of FIG. 6 is affirmative (YES), the result of the determination 9-2 will also be affirmative (YES). For this reason, the migration interval (the time interval during which the loop shown in FIG. 9 is executed) will be longer than the cache management interval (the time interval during which the loop of S603 through S611 of FIG. 6 is executed).

FIG. 10 shows the flow of processing for the volume migration of S905.

In S1001, a determination 10-1 is made. In the determination 10-1, the migration management program 174 determines whether or not there is a storage that includes an area (the migration-destination volume) capable of storing the data inside the target volume. This determination may be made by referencing the configuration information related to each storage (for example, information that comprises information denoting which storage includes which volume, and on which RAID group the creation of this volume is based). In a case where the result of the determination 10-1 is negative, this migration process ends. By contrast, in a case where the result of the determination 10-1 is affirmative, S1002 is executed.

In S1002, a determination 10-2 is made. In the determination 10-2, in a case where the data inside the target volume was migrated to the storage detected in S1001, the migration management program 174 determines whether or not this storage will be overloaded. Specifically, for example, in a case where it is supposed, based on the measured I/O performance, the I/O increasing rate, and the cache utilization status information with respect to the target set, that the target volume has been migrated, the migration management program 174 predicts the change in the utilization status of the cache memory inside the migration-destination storage, and determines whether or not the predicted status is an overload state. In a case where the result of the determination 10-2 is affirmative, S1001 is executed once again. That is, a determination is made as to whether or not there is a storage that includes an area capable of storing the data inside the target volume. By contrast, in a case where the result of the determination 10-2 is negative, S1003 is executed.

In S1003, the migration management program 174 registers the information related to the migration schedule in the migration management table 501. The scheduled migration start time may be determined based on the amount of data inside the target volume, or another type of information.

One embodiment of the present invention has been explained above, but the present invention is not limited to this embodiment, and various variations and modifications may be possible without departing from the scope of the present invention.

What is claimed is:

1. A cache control apparatus provided in a computer system including an access source and a storage apparatus, wherein the access source issues an Input/Output (I/O) command; and the storage apparatus includes a plurality of storage devices and a controller including a cache memory, the cache memory includes an allocated cache area, and the controller executes input/output of data in response to the I/O command from the access source, and uses the cache area when executing this input/output, the cache control apparatus comprising:

a storage resource; and
a processor coupled to the storage resource,
the storage resource storing:
 cache utilization status information, which is information denoting a cache utilization status of the cache area; and
 I/O status information, which is information denoting the I/O status in accordance with the I/O command from the access source,
the processor:
 (X) determining, based on the I/O status information, whether or not the performance of an I/O from the access source drops; and
 (Y) executing cache control, in a case where the result of the determination in the (X) is affirmative,
 wherein the cache control is to change the cache utilization status specified from the cache utilization status information to a cache utilization status that improves I/O performance,
wherein the access source is an application for issuing an I/O command specifying a logical volume, a plurality of applications are executed by one or more host apparatuses, a relay apparatus including a cache memory exists between the one or more host apparatuses and the storage apparatus, the plurality of storage devices are a plurality of logical volumes, the storage resource stores application management information, the I/O status information denotes the actual I/O performance and I/O increasing rate for each application/volume set, the cache utilization status information denotes I/O characteristics and a cache mode selected from among a plurality of cache modes for each cache area, the application management information denotes a required I/O performance for each application/volume set, the application/volume set is a set of the application and the logical volume to be input or output to/from this application data, the required I/O performance is the I/O performance required from the application, and is a value based on a log of the performance of I/O from the application, the processor acquires information from the one or more host apparatuses and/or the storage apparatus, and based on this information, updates the I/O status information, the cache utilization status information, and the application management information, each cache mode is defined based on the type of data that has been made to reside in the cache area and/or the capacity of the cache area, the processor executes the following processing (A) and (B) for a first set, which is an application/volume set including a first application and a first logical volume:

(A) determination is made, on the basis of the required I/O performance, the actual I/O performance and the I/O increasing rate corresponding to the first set, whether or not I/O performance drops below this required I/O performance at a certain point in time in the future for the first set; and (B) in a case where the result of the determination in the (A) is affirmative, the following processing (b1) through (b6) is executed:

(b1) determination is made whether or not the cache mode for a target cache area, which is the cache area allocated to the first logical volume, is suitable to I/O characteristics for the target cache area;

(b2) in a case where the result of the determination in the (b1) is negative, as the cache control, the cache mode of the target cache area is changed to a different cache mode based on the I/O characteristics of the target cache area, or frequently read data of the data stored in the target cache area is made to reside in the target cache area;

(b3) in a case where the result of the determination in the (b1) is affirmative, whether or not there is a first surplus cache area related to a first path is determined;

(b4) in a case where the result of the determination in the (b3) is affirmative, as the cache control, an additional allocation of the first surplus cache area to the first logical volume is made;

(b5) in a case where the result of the determination in the (b3) is negative, determination is made, based on the actual I/O performance the I/O increasing rate and the required I/O performance for a second set, which is a different application/volume set, as to whether or not at least a portion of the cache area allocated to a second logical volume belonging to the second set is releasable; and (b6) in a case where the result of the determination in the (b5) is affirmative, as the cache control a second surplus cache area, which is at least a portion of the cache area allocated to the second logical volume is released, and additionally at least a portion of the released the second surplus cache area is allocated to the first logical volume, and wherein the first path is the path between the first application and the first logical volume, the first surplus cache area is a storage area of the cache memory inside the relay apparatus through which the first path passes, and is a cache area that has not been allocated to any logical volume, and the capacity of the second surplus cache area is determined on the basis of the actual I/O performance, the I/O increasing rate, and the required I/O performance for the second set.

2. The cache control apparatus according to claim 1, wherein the computer system comprises another storage apparatus, and the logical volume of the storage apparatus can be migrated to the other storage apparatus, the processor, in a case conforming to the following (P) and (Q) conditions, the first logical volume is migrated to the other storage apparatus from the storage apparatus:
(P) determination is made that the I/O performance for the first set drops below the required I/O performance at a certain point in the future even when the processing of the (B) has been executed; and
(Q) estimate is made that the other storage apparatus is not overloaded even when the first logical volume is migrated to the other storage apparatus from the storage apparatus.

3. The cache control apparatus according to claim 1, wherein processing of the (A) and (B) is executed for each application/volume set, and is executed first from the application/volume set including the highest I/O increasing rate when executing this processing.

4. The cache control apparatus according to claim 1, wherein the processor, as the cache control, additionally allocates the first surplus cache area, which is an unallocated cache area.

5. The cache control apparatus according to claim 4, wherein a relay apparatus including a cache memory exists between the access source and the storage apparatus, and the first surplus cache area is the cache area of the cache memory inside the relay apparatus.

6. The cache control apparatus according to claim 4, wherein the processor additionally allocates the first surplus cache area in a case of the following either (f1) or (f2):
(f1) a resident track read ratio is higher than a certain volume; or
(f2) the resident track read ratio is not greater than a certain value, but there are more reads than writes for the cache area, and all the data is resident data, wherein the resident track read ratio is a ratio of resident data reads of the input/output to/from the cache area.

7. The cache control apparatus according to claim 6, wherein the (f1) is the following either (f11) or (f12):
(f11) a read hit rate is higher than a first certain value, and the resident track read ratio is higher than a second certain value; or
(f12) the read hit rate is not greater than the first certain value, and a write ratio is not greater than a third certain value, and the resident track read ratio is higher than the second certain value, and
wherein, the read hit rate is the ratio at which read-targeted data has been detected among the cache area reads, and the write ratio is the ratio of writes executed among the inputs/outputs to/from the cache area.

8. The cache control apparatus according to claim 6, wherein the input/output to/from the cache area is executed in accordance with a set cache mode, and the processor sets, for the additionally allocated first surplus cache area, the cache mode for making read data reside in the cache area without making write data reside in the cache area.

9. The cache control apparatus according to claim 4, wherein the input/output to/from the cache area is executed in accordance with a set cache mode, and the processor additionally allocates the first surplus cache area in the case of the following (g1) and (g2):
(g1) the read hit rate is not greater than a certain value, but the write ratio is higher than a certain value; and
(g2) the cache mode set for the cache area is the cache mode for making both write data and read date reside in the cache area, and wherein the read hit rate is the ratio at which read-targeted data has been detected among the cache area reads, and the write ratio is the ratio of writes executed among the inputs/outputs to/from the cache area.

10. The cache control apparatus according to claim 9, wherein the processor sets, for the additionally allocated first surplus cache area, the cache mode for making both write data and read data reside in the cache area.

11. The cache control apparatus according to claim 1, wherein the processor, as the cache control, releases at least a portion of another cache area, and additionally allocates as a new cache area at least a portion of a second surplus cache area, which is the part that has been released.

12. The cache control apparatus according to claim 11, wherein determination is made as to whether or not a hit has occurred when using the cache area, a hit signifies that either an area for storing a write-targeted data or an area in which a read-targeted data is stored has been detected in the cache area, and the processor preferentially releases, from within the other cache area, a write-data-storing second part including a hit rate that is not greater than a certain value over a read-data-storing first part including a hit rate that is not greater than a certain value.

13. The cache control apparatus according to claim 12, wherein the processor preferentially releases, from within the other cache area, a resident-data-storing third part including a hit rate that is not greater than a certain value over the second part.

14. The cache control apparatus according to claim 11, wherein the processor determines a storage capacity of an area to be released based on the required I/O performance and the actual I/O performance for the access source.

15. The cache control apparatus according to claim 1, wherein the processor, as the cache control, causes more of read data existing in the cache area to reside.

16. The cache control apparatus according to claim 1, wherein input/output to/from the cache area is executed in accordance with a set cache mode, and the processor, as the cache control, changes the cache mode for the cache area to a different cache mode that increases an amount of resident data in the cache area.

17. The cache control apparatus according to claim 1, wherein the plurality of storage devices are a plurality of logical volumes, the computer system includes another storage apparatus, and the processor, as the cache control, migrates a logical volume from the storage apparatus to the other storage apparatus.

18. The cache control apparatus according to claim 17, wherein the processor, as the cache control, executes the migration in a case where I/O performance drops even if any of the following (h1) through (h4) is executed:
(h1) a surplus cache area, which is an unallocated cache area, is additionally allocated;
(h2) at least one portion of another cache area is released, and at least one portion of the surplus cache area, which is the part that has been released, is additionally allocated;
(h3) more of read data existing in the cache area is made to reside; and (h4) the cache mode for the cache area is changed to a different cache mode that increases the data to be made resident in the cache area.

19. A cache control method executed by a computer system including an access source and a storage apparatus, wherein the access source issues an Input/Output (I/O) command, and the storage apparatus includes a plurality of storage devices, and a controller including a cache memory, the cache memory includes an allocated cache area, and the controller executes data input/output in response to the I/O command from the access source, and uses the cache area when executing this input/output, the cache control method comprising the steps of:

(X) determining, based on I/O status information, which is information denoting an I/O status in accordance with the I/O command from the access source, whether or not performance of an I/O from the access source drops; and (Y) executing, in a case where the result of the determination in the (X) is affirmative, cache control for changing a cache utilization status specified from cache utilization status information, which is information denoting the cache utilization status related to the cache area, to a cache utilization status for improving I/O performance, wherein the access source is an application for issuing an I/O command specifying a logical volume, a plurality of applications are executed by one or more host apparatuses, a relay apparatus including a cache memory exists between the one or more host apparatuses and the storage apparatus, the plurality of storage devices are a plurality of logical volumes, the storage resource stores application management information, the I/O status information denotes the actual I/O performance and I/O increasing rate for each application/volume set, the cache utilization status information denotes I/O characteristics and a cache mode selected from among a plurality of cache modes for each cache area, the application management information denotes a required I/O performance for each application/volume set, the application/volume set is a set of the application and the logical volume to be input or output to/from this application data, the required I/O performance is the I/O performance required from the application, and is a value based on a log of the performance of I/O from the application, the processor acquires information from the one or more host apparatuses and/or the storage apparatus, and based on this information, updates the I/O status information, the cache utilization status information, and the application management information, each cache mode is defined based on the type of data that has been made to reside in the cache area and/or the capacity of the cache area the processor executes the following processing (A) and (B) for a first set, which is an application/volume set including a first application and a first logical volume:

(A) determining, on the basis of the required I/O performance, the actual I/O performance and the I/O increasing rate corresponding to the first set, whether or not I/O performance drops below this required I/O performance at a certain point in time in the future for the first set; and (B) in a case where the result of the determining in the (A) is affirmative, the following processing (b1) through (b6) is executed:

(b1) determining whether or not the cache mode for a target cache area, which is the cache area allocated to the first logical volume, is suitable to I/O characteristics for the target cache area;

(b2) in a case where the result of the determining in the (b1) is negative, as the cache control, changing the cache mode of the target cache area to a different cache mode based on the I/O characteristics of the target cache area, or frequently read data of the data stored in the target cache area is made to reside in the target cache area;

(b3) in a case where the result of the determining in the (b1) is affirmative, determining whether or not there is a first surplus cache area related to a first path;

(b4) in a case where the result of the determining in the (b3) is affirmative, as the cache control, making an additional allocation of the first surplus cache area to the first logical volume;

(b5) in a case where the result of the determining in the (b3) is negative, determining, based on the actual I/O performance, the I/O increasing rate and the required I/O performance for a second set, which is a different application/volume set, as to whether or not at least a portion of the cache area allocated to a second logical volume belonging to the second set is releasable; and (b6) in a case where the result of the determining in the (b5) is affirmative, releasing, as the cache control, a second surplus cache area, which is at least a portion of the cache area allocated to the second logical, and additionally allocating at least a portion of the released the second surplus cache area to the first logical volume, and wherein the first path is the path between the first application and the first logical volume, the first surplus cache area is a storage area of the cache memory inside the relay apparatus through which the first path passes and is a cache area that has not been allocated to any logical volume, and the capacity of the second surplus cache area is determined on the basis of the actual I/O performance, the I/O increasing rate, and the required I/O performance for the second set.

\* \* \* \* \*